United States Patent

[11] 3,626,046

[72] Inventors Horst Krause;
 Richard Sigel, both of Garching, Germany
[21] Appl. No. 885,545
[22] Filed Dec. 16, 1969
[45] Patented Dec. 7, 1971
[73] Assignee Institut fur Plasmaphysik G.m.b.H.
 Munich, Germany
[32] Priority Dec. 16, 1968
[33] Germany
[31] P 18 14 884.4

[54] METHOD OF MAKING A SOLIDIFIED DISC FROM MATERIAL WHICH IS A GAS AT ROOM TEMPERATURE
3 Claims, 3 Drawing Figs.
[52] U.S. Cl. .................................................. 264/81,
 62/10, 264/28, 264/101
[51] Int. Cl. ........................................ B29c 13/00,
 B29d 3/00
[50] Field of Search .......................... 264/28, 81,
 101; 62/10

[56] References Cited
UNITED STATES PATENTS
3,516,879 6/1970 Paine............................ 264/28 X Primary Examiner—Robert F. White
Assistant Examiner—J. H. Silbaugh
Attorney—Spencer and Kaye ABSTRACT: A method for making a thin, self-supporting disc from a substance, such as hydrogen, which is a gas at room temperature said disc being eventually located in a vacuum. A metal member is provided which defines a hole having a diameter small enough that at a sufficiently low temperature a liquid film of the substance will form in or across the hole due to surface tension. The atmosphere surrounding the hole is first reduced to a high vacuum and then the space or zone surrounding the hole is made smaller. A predetermined quantity of the gas to be solidified is brought into this lesser space and a cryogen cools the gas below its boiling point. This causes the gas to condense on the surface of the metal member and form a liquid film in the hole. The liquid film is further cooled until it solidifies in the form of a thin, self-supporting disc. An apparatus including a diffusion pump, a vacuum chamber, and a reciprocating glass bell within the vacuum chamber is provided to carry out the method.

Inventors.
Horst Krause
Richard Sigel

Inventors.
Horst Krause
Richard Sigel

METHOD OF MAKING A SOLIDIFIED DISC FROM MATERIAL WHICH IS A GAS AT ROOM TEMPERATURE

BACKGROUND OF THE INVENTION

The present invention relates to a method for making a thin, self-supporting disc in a high vacuum from a substance, such as hydrogen, which is a gas at room temperature.

Materials in the form of a film spread out in a high vacuum environment are required for many investigations in physics. The production of a self-supporting film from a solid material is very difficult, however, particularly when the material is a gas at room temperature and the freezing point of the gas is very low. The difficulty consists, on the one hand, in that such gases must first be cooled to a very low temperature before they change to the liquid and solid states. On the other hand, it is essential to keep the solidified material from returning prematurely to the gaseous state. This requires careful insulation of the solidified material, which makes handling and accessibility to the material difficult.

Interest in the production of targets from solid hydrogen has recently been created in plasmaphysics, because it is hoped to obtain hot plasma of high purity by vaporization and ionization of solid hydrogen with the aid of regenerative pulse lasers. As is well known in the art, due to the high power density achievable with a focused pulsed laser beam a breakdown occurs in an initially transparent solid, such as solid hydrogen, and causes strong absorption of the laser light. This result in a strong heating of the matter, which subsequently expands as a hot plasma into the surrounding vacuum environment. In connection with the investigation of this process it is particularly desirable to bring solid hydrogen in the form of a thin disc, or platelet, into the focus of the laser beam. The problems related to this process as well as experimental observations are discussed in the following publications:

1. R. Sigel, K. Buechl, P. Mulser and S. Witkowski, Phys. Lett. 26A, 498 (1968)
2. R. Sigel, Dissertation T. H. Muenchen (1969) and Laboratory Report JPP 3/96 (1969)

Thin discs of solid hydrogen, or other suitable substance which is a gas at room temperature, may also be useful as targets for particle accelerators or, when heated by a point source of energy, as for example a focused laser beam, as a ion source for such accelerators.

SUMMARY OF THE INVENTION

An object of the present invention is to provide a method which will make it possible to produce in a simple, economical and rapid manner a thin, self-supporting filmlike disc in a high vacuum from a substance, such as hydrogen, which is a gas at room temperature.

This and other objects are achieved according to the present invention by providing a metal member having a hole the diameter of which is so small that a liquid film can form in and extend across such hole when the metal member is cooled below the boiling point of the substance in an environment containing the substance in its gaseous state until the liquified substance condenses on the surface of the metal member and runs into the hole to form a liquid film. The temperature of the metal member is then lowered still further, until the liquid film solidifies in the form of a thin, self-supporting disc.

The present invention also provides a preferred apparatus for carrying this process into effect; which apparatus includes a cooling device through which a cooling medium, such as a cryogen, flows and at the lower end of which is mounted the metal member having a hole therein, a device for controlling the temperature of the cooling device, and a vacuum chamber which is connected to a high-vacuum pump and to an arrangement for feeding a gas into a portion of the vacuum chamber containing the metal member. The vacuum chamber also contains a movable arrangement for selectively placing the portion of the vacuum chamber containing the metal member into and out of communication with the vacuum pump.

DESCRIPTION OF THE PREFERRED EMBODIMENTS

Figure 1:
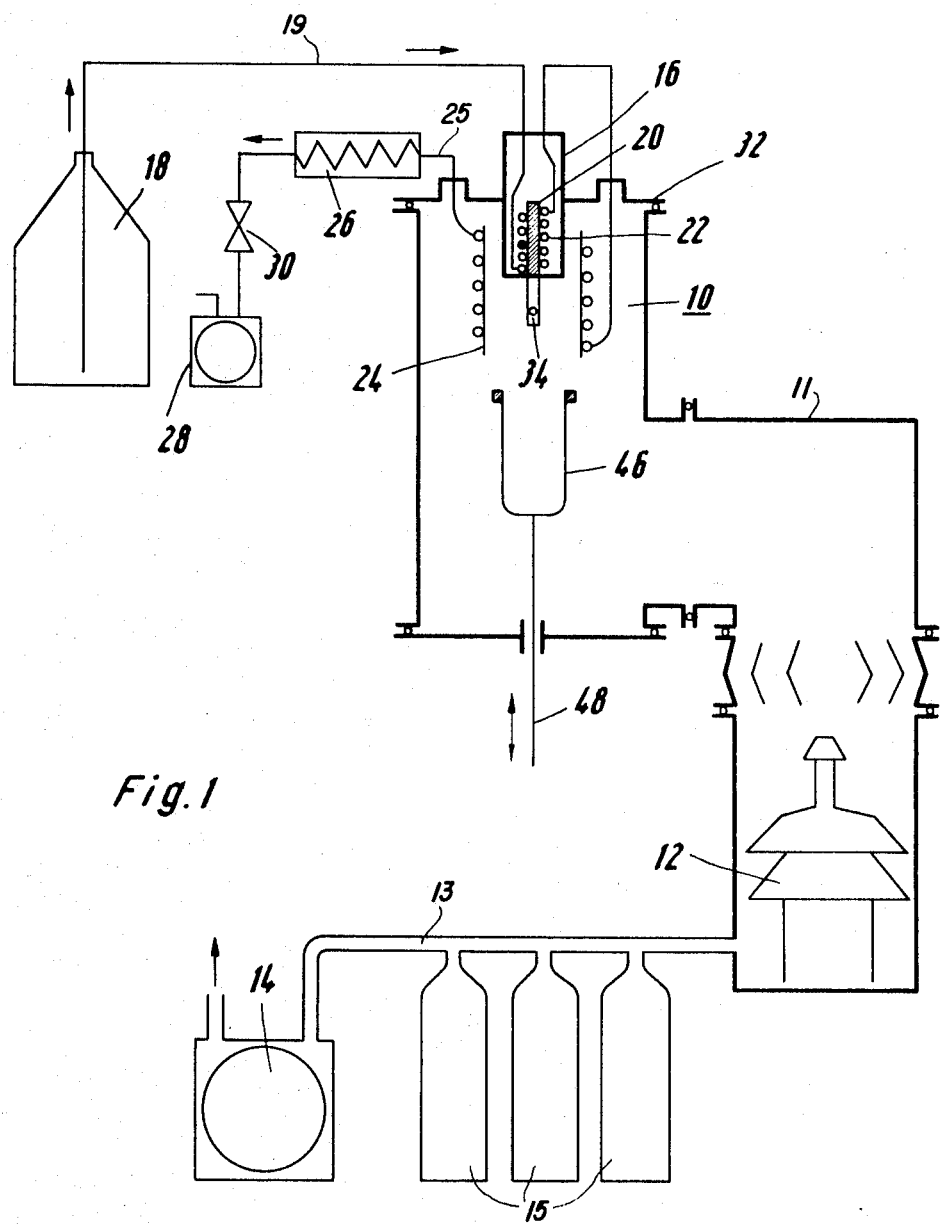
FIG. 1 is a schematic view of an installation including an apparatus according to the present invention.

FIG. 1 shows a vacuum chamber 10, which may be of conventional construction, connected to a high-vacuum pump, such as a diffusion pump 12, by means of a suitable housing 11. Diffusion pump 12 has a high-suction capacity, for example, about 2 cubic meters per second. A cylinder 24, which may be constructed of copper sheet, is cooled by a suitable cryogen, such as liquid helium, and acts additionally as a cryopump of high-suction capacity. A suitable, well-known positive displacement pump, such as rotary pump 14, is connected to the diffusion pump 12 by means of a fore vacuum line 13 communicating with buffer containers 15. Such vacuum systems are well known in the art.

In order to make the disc of, for example, solid hydrogen, hydrogen gas is liquified and frozen by means of, for example, liquid helium. A cooling device 16 is used for this purpose. This cooling device 16 is designed with a low heat capacity which makes it possible to start and stop the process for making the disc without any significant helium losses.

As can be seen from FIG. 1, the cooling device 16 is supplied with liquid helium from a conventional storage chamber 18 by means of a siphon 19. The liquid helium flows first through a helical cooling coil 22 (See FIG. 2), which is wrapped around a block 20. Block 20 may be made of copper or other material of good thermal conductivity. The liquid helium then flows through helical coil 23 which is wrapped around cylinder 24 and is then sent to a heating device 26, such as a conventional heat exchanger or a simple waterjacket via a line 25 and is heated to room temperature. A second rotary pump 28 then compresses the helium, which is now a gas. The flow of helium, and, consequently, the temperature of the block 20, can be controlled manually by means of a conventional throttle valve 30.

Figure 2:
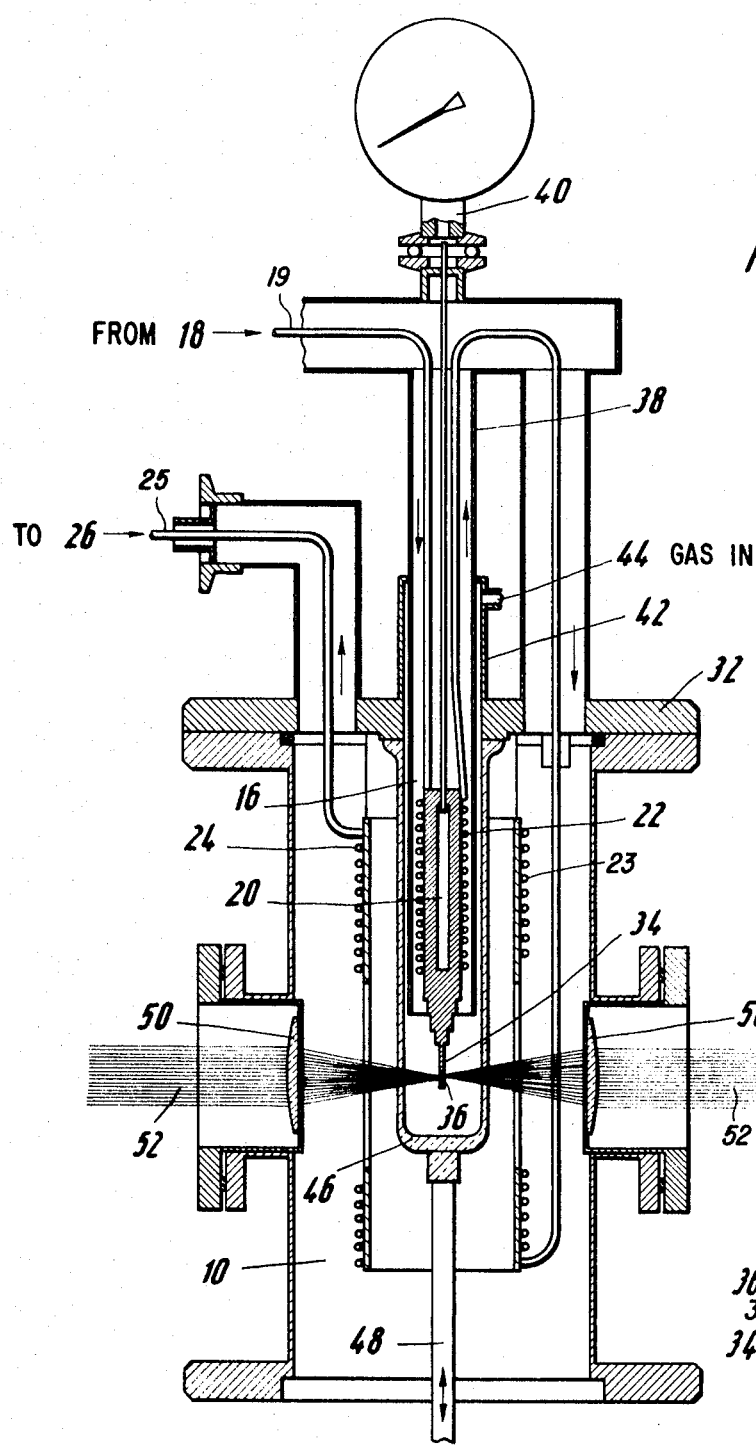
FIG. 2 is a schematic view of a part of the apparatus of FIG. 1 shown on a larger scale.
Figure 3:
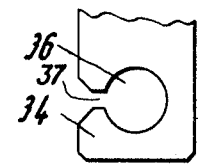
FIG. 3 is a side elevation view of a portion of an element of the apparatus according to FIGS. 1 and 2 shown on a larger scale.

The cooling device 16 is mounted as a unit on the top of the vacuum chamber 10 by means of a flange 32 (see FIG. 2). This mounting is so arranged that the part of the unit containing the block 20 extends into the vacuum chamber. Mounted at the bottom of the block 20 is a member 34 which is cooled by the cooling device and is constructed from a copper plate (or other metal of high thermal conductivity) about 1 millimeter thick. Any suitable, well-known method may be used to mount member 34 to block 20. Member 34 has a hole 36 at its lower end, the diameter of hole 36 being about 2 millimeters. The hole 36 also has an opening 37 of slotlike form on at least one side (see FIG. 3), so as to permit measurement of the thickness of the disc formed from the solidified material. Two diametrally opposite slot openings may be used, in such case the integrity of member 34 is maintained by a suitable bridging member means which may be comprise at least one stirrup extending across and spaced from the slots.

The block 20 is thermally insulated by a thin-walled, stainless steel tube 38 and is provided with a conventional vapor pressure thermometer 40 mounted on the top of the tube 38. In addition, a jacket 42 surrounds the tube 38. jacket 42 has an inlet 44 which can be connected to a source of a suitable gas to be solidified, such as hydrogen. This gas source is not shown in the drawings. Inlet 44 enables hydrogen gas to be fed into that portion of the vacuum chamber 10 which contains the member 34. This portion can be separated from the pump 12 by a glass bell 46 which is mounted in a well-known manner so as to be reciprocating. The glass bell 46 can be reciprocated by means of a rod 48 which is passed through the bottom wall of the vacuum chamber 10 in vacuum-tight relationship therewith. This vacuum-tight relationship can be achieved by a conventional vacuum seal.

In operation, the vacuum chamber 10 is first evacuated by the diffusion pump 12 with the glass bell 46 in its down position (FIG. 1). The liquid helium is then sent from chamber 18 through line 19 and into cooling coils 22 and 23. Simultaneously, the glass bell 46 is pushed upwardly until its rim portion at the top end bears against the flange 32, as shown in FIG. 2. Hydrogen gas is now passed into the bell 46 through the inlet 44 in jacket 42. The volume and charging pressure under the glass bell 46 are so chosen that, on the one hand, a liquid phase must be produced during the cooling, and on the other hand, no drops of condensed liquid fall into the glass bell, before the solid state is achieved.

Since the metal member 34 is made of a material of good thermal conductivity and is in direct thermal contact with block 20 cooled by the coolant passed through coil 22, the gas condenses mainly on the metal member 34. Glass bell 46 remains clear and transparent so that the condensation process may be observed by visual inspection.

During the cooling of the gas within the glass bell 46, it is observed through the glass bell 46 that a film of liquid hydrogen spreads out on the surface of the member 34 and finally covers the hole 36 with a film of liquid. This film is formed due to the surface tension of the liquid. As the metal member 34 within the bell 46 is cooled further, it is observed that the hydrogen first freezes at the edge of the hole 36 and that the boundary surface slowly moves from the edge to the center of the hole in a solid-liquid state. By suitable control of the flow of helium by means of throttle valve 30, to obtain a sufficiently slow rate of removal of heat from the freezing liquid film, a disc of solid hydrogen can be obtained which is completely free of schlieren regions. The freezing process may be monitored visually and if schlieren regions are observed, the coolant flow is reduced or stopped until the substance has returned to the liquid or gaseous state, and the coolant flow is initiated again at a lower rate until a schlieren-free solid disc is obtained. With the apparatus described a clear schlieren-free disc of solid hydrogen was obtained by solidifying the liquid hydrogen film within about 10 seconds. When all of the liquid hydrogen has frozen, the vapor pressure in the condensation space, or space within the bell 46, begins to fall steadily. The glass bell 46 is drawn away, when the vapor pressure has fallen to a few millimeters of mercury. The residual hydrogen gas flows into the vacuum chamber and is removed by the vacuum system. A clear disc of solid hydrogen is left in the hole 36 in the member 34. During the life of this hydrogen disc, which may be up to 10 minutes or more, a pressure of $10^{-5}$ millimeters of mercury may be maintained in the vacuum chamber 10 by the diffusion pump 12. The actual pressure is not critical and depends on the specific vacuum system employed. The disc gradually decreases from a thickness of about 1 millimeter in the case of the embodiment described to zero. The diameter of the disc remains unchanged while its thickness is decreasing. The two surfaces of the disc gradually become more and more planar as the thickness decreases. The thickness at any time can be measured from the side through the opening 37 with a long-focus microscope. Due to the high-vacuum, the disc will actually sublimate from a solid to a gas.

When the disc has disappeared or at any time before, the glass bell 46 can be brought back into its upward position and a fresh charge of hydrogen gas injected into the condensation space for immediately making a new disc.

As shown in FIG. 2, the vacuum chamber 10 has two windows 50 in the form of oppositely oriented, planoconvex lenses, through which the disc can be radiated with a laser beam 52. The lenses are so designed that the disc will be at their focal point.

Of course, the present invention is not restricted to the use of hydrogen, but can also be employed for producing disc from any other material which is a gas at room temperature and is solidifiable. An example of such a gas is deuterium or tritium or one of the noble gases other than helium. It may then possible to operate with other cooling media, the exact media depending on the particular substance used.

It will be understood that the above description of the present invention is susceptible to various modifications, changes and adaptations, and the same are intended to be comprehended within the meaning and range of equivalents of the appended claims.

We Claim:

1. A method for making a thin, self-supporting disc from a substance which is a gas at room temperature comprising the steps of:
    a. providing in an atmosphere of the substance in a gaseous state a metal member defining a hole having a diameter small enough that at a sufficiently low temperature a liquid film of said substance will form across the hole due to surface tension;
    b. cooling the metal member below the boiling point of the substance until the substance condenses on the surface of the metal member and forms a liquid film across the hole; and
    c. cooling the metal member until the liquid film freezes to form a solidified disc.

2. A method as defined in claim 1 further including the steps of reducing the pressure in the space surrounding the metal member to a high-vacuum, confining the space around the metal member to a predetermined limited volume, and injecting only enough of the substance in a gaseous state to achieve a predetermine mass and charging pressure within the limited volume around the metal member.

3. A method as defined in claim 1 further including the step of bringing the solidified disc to a desired thickness by subliming off the solidified material substance.

* * * * *

UNITED STATES PATENT OFFICE
CERTIFICATE OF CORRECTION

Patent No. 3,626,046            Dated      December 7, 1971

Inventor(s)     Horst Krause et al.

It is certified that error appears in the above-identified patent and that said Letters Patent are hereby corrected as shown below:

In the heading of the patent, line 10, change "P 18 14 884.4" to -- P 18 14 888.4 --. Column 2, line 67, change "jacket", second occurrence, to -- Jacket --. Column 4, line 49, change "predetermine" to -- predetermined --; line 53, delete "material".

Signed and sealed this 18th day of July 1972.

(SEAL)
Attest:

EDWARD M. FLETCHER, JR.
Attesting Officer

ROBERT GOTTSCHALK
Commissioner of Patents